(12) United States Patent
Kamplain et al.

(10) Patent No.: US 10,087,504 B2
(45) Date of Patent: Oct. 2, 2018

(54) SEMICONDUCTOR NANOCRYSTALS AND METHOD OF PREPARATION

(71) Applicant: SAMSUNG ELECTRONICS CO., LTD., Suwon-si (KR)

(72) Inventors: Justin W. Kamplain, Bartlesville, OK (US); Keeve Gurkin, Somerville, MA (US); Peter Allen, Boston, MA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 108 days.

(21) Appl. No.: 15/180,656

(22) Filed: Jun. 13, 2016

(65) Prior Publication Data

US 2017/0066050 A1    Mar. 9, 2017

Related U.S. Application Data

(60) Provisional application No. 62/204,969, filed on Aug. 13, 2015.

(51) Int. Cl.
| | |
|---|---|
| *H01L 33/30* | (2010.01) |
| *C22C 1/00* | (2006.01) |
| *C01G 28/02* | (2006.01) |

(52) U.S. Cl.
CPC ............ *C22C 1/007* (2013.01); *C01G 28/026* (2013.01)

(58) Field of Classification Search
None
See application file for complete search history.

(56) References Cited

U.S. PATENT DOCUMENTS

| | | | |
|---|---|---|---|
| 6,855,202 B2* | 2/2005 | Alivisatos | C30L 37/00 117/68 |
| 7,399,429 B2* | 7/2008 | Liu | B82Y 20/00 252/301.4 R |

(Continued)

FOREIGN PATENT DOCUMENTS

| | | |
|---|---|---|
| WO | 2007143197 A2 | 12/2007 |
| WO | 2008133660 A2 | 11/2008 |

(Continued)

*Primary Examiner* — George P Wyszomierski
(74) *Attorney, Agent, or Firm* — Cantor Colburn LLP

(57) ABSTRACT

A method for preparing semiconductor nanocrystals comprising indium arsenide is disclosed. The method includes heating a first mixture including nanocrystal seeds comprising indium arsenide with an absorbance in a range from about 700 to 800 nm and a liquid medium in a reaction vessel to a first temperature; and combining the nanocrystals seeds comprising indium arsenide with an indium-source mixture and an arsenic-source mixture under conditions suitable to increase the size of the seeds to form the semiconductor nanocrystals comprising indium arsenide, wherein the indium-source mixture includes an indium precursor, a coordinating solvent, and a carboxylic acid; and the arsenic-source mixture includes a liquid medium and an arsenic precursor represented by the formula $As(Y(R)_3)_3$, where Y is Ge, Sn, or Pb; and each R, independently, is alkyl, alkenyl, alkynyl, cycloalkyl, cycloalkenyl, heterocyclyl, aryl, or heteroaryl, wherein each R, independently, is optionally substituted by 1 to 6 substituents independently selected from hydrogen, halo, hydroxy, nitro, cyano, amino, alkyl, cycloalkyl, cycloalkenyl, alkoxy, acyl, thio, thioalkyl, alkenyl, alkynyl, cycloalkenyl, heterocyclyl, aryl, or heteroaryl. Semiconductor nanocrystals are also disclosed.

14 Claims, 3 Drawing Sheets

(56) References Cited

U.S. PATENT DOCUMENTS

| | | | |
|---|---|---|---|
| 2009/0162011 A1 | 6/2009 | Coe-Sullivan et al. | |
| 2010/0090164 A1* | 4/2010 | Peng .................... | C09K 11/02 252/301.4 R |
| 2017/0130127 A1 | 5/2017 | Kamplain et al. | |

FOREIGN PATENT DOCUMENTS

| | | |
|---|---|---|
| WO | 2010014198 A1 | 2/2010 |
| WO | 2012099653 A2 | 7/2012 |
| WO | 2013040365 A2 | 3/2013 |
| WO | 2013173409 A1 | 11/2013 |

* cited by examiner

SEMICONDUCTOR NANOCRYSTALS AND METHOD OF PREPARATION

This application claims priority to U.S. Provisional Patent Application No. 62/204,969, filed 13 Aug. 2015, which is hereby incorporated herein by reference in its entirety for all purposes.

FEDERALLY SPONSORED RESEARCH OR DEVELOPMENT

This invention was made with Government support under Research Grant No. D11AP00285 (formerly N11AP20028) awarded by the Defense Advanced Research Projects Agency. The Government has certain rights in the invention.

TECHNICAL FIELD OF THE INVENTION

The present invention relates to the technical field of nanotechnology, and more particularly to semiconductor nanocrystals and methods for preparing same.

SUMMARY OF THE INVENTION

In accordance with one aspect of the present invention, there is provided a method for preparing semiconductor nanocrystals comprising indium arsenide, the method comprising:

heating a first mixture including nanocrystal seeds comprising indium arsenide with an absorbance in a range from about 700 to 800 nm and a liquid medium in a reaction vessel to a first temperature; and combining the nanocrystals seeds comprising indium arsenide with an indium-source mixture and an arsenic-source mixture under conditions suitable to increase the size of the seeds to form the semiconductor nanocrystals comprising indium arsenide, wherein the indium-source mixture includes an indium precursor, a coordinating solvent, and a carboxylic acid; and the arsenic-source mixture includes a liquid medium and an arsenic precursor represented by the formula (I):

$$As(Y(R)_3)_3 \qquad (I)$$

where Y is Ge, Sn, or Pb; and each R, independently, is alkyl, alkenyl, alkynyl, cycloalkyl, cycloalkenyl, heterocyclyl, aryl, or heteroaryl, wherein each R, independently, is optionally substituted by 1 to 6 substituents independently selected from hydrogen, halo, hydroxy, nitro, cyano, amino, alkyl, cycloalkyl, cycloalkenyl, alkoxy, acyl, thio, thioalkyl, alkenyl, alkynyl, cycloalkenyl, heterocyclyl, aryl, or heteroaryl.

In certain preferred embodiments, the carboxylic acid comprises acetic acid or oleic acid.

In certain embodiments, the arsenic-source mixture is provided to the reaction vessel including the seeds as a substantially steady or substantially constant infusion or feed or source and the indium-source mixture is added as one or more discrete additions, one being added before the addition of the arsenic-source mixture is initiated.

In certain embodiments, heating of the reaction vessel is continued during the addition of the arsenic-source mixture and indium-source mixture to the reaction vessel.

In certain embodiments, the method further comprises continuing to heat the reaction vessel after the addition of the arsenic-source mixture and indium-source mixture to the reaction vessel is completed.

It should be appreciated by those persons having ordinary skill in the art(s) to which the present invention relates that any of the features described herein in respect of any particular aspect and/or embodiment of the present invention can be combined with one or more of any of the other features of any other aspects and/or embodiments of the present invention described herein, with modifications as appropriate to ensure compatibility of the combinations. Such combinations are considered to be part of the present invention contemplated by this disclosure.

Additional information concerning the foregoing, and other information useful with the present inventions is provided below.

It is to be understood that both the foregoing general description and the following detailed description are exemplary and explanatory only and are not restrictive of the invention as claimed. Other embodiments will be apparent to those skilled in the art from consideration of the description and drawings, from the claims, and from practice of the invention disclosed herein.

DETAILED DESCRIPTION OF THE INVENTION

Figure 1A:
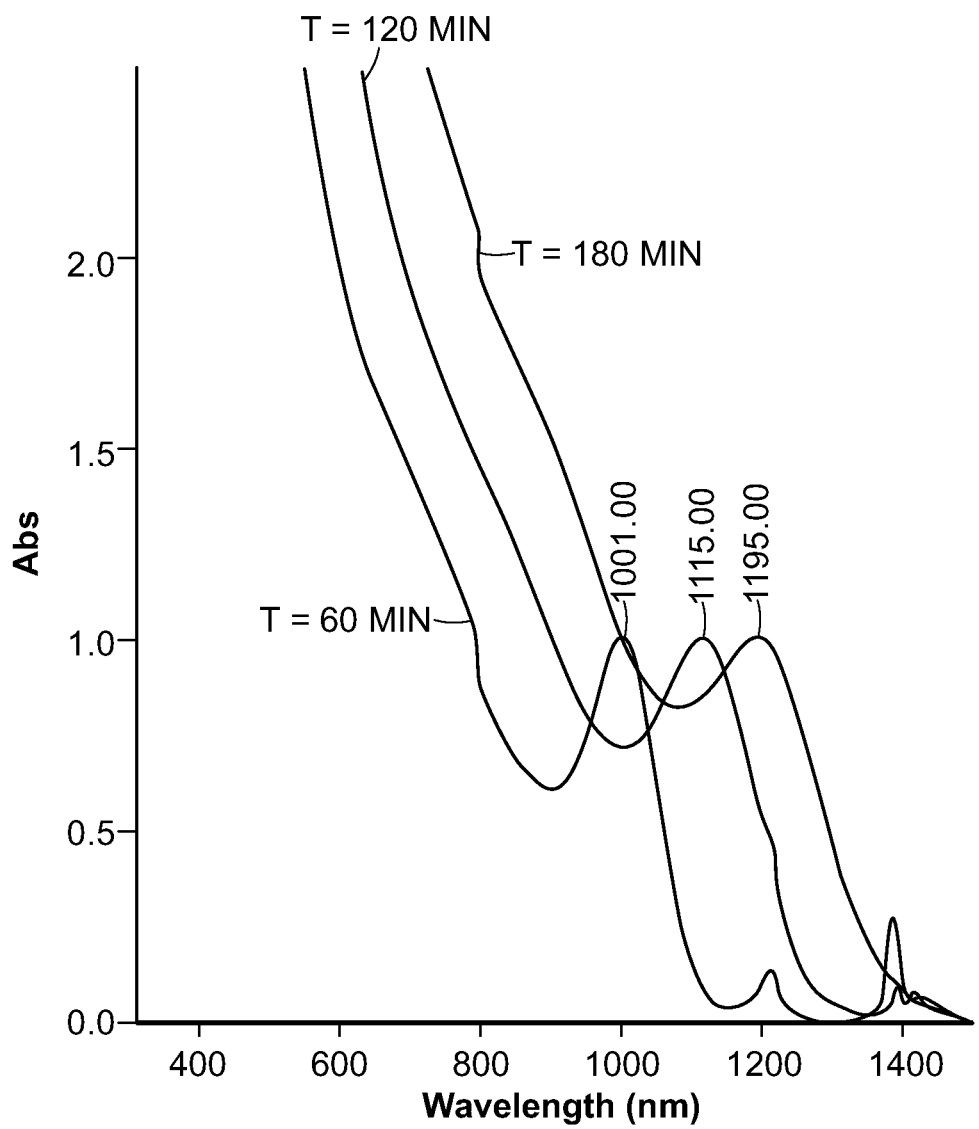
FIGS. 1A-1D graphically depict data relating to various examples described in the specification.

Various aspects and embodiments of the present inventions will be further described in the following detailed description.

The present invention relates to methods for preparing semiconductor nanocrystals. The present invention further relates to semiconductor nanocrystals.

Semiconductor nanocrystals have size-dependent optical and electronic properties. In particular, the band gap energy of a semiconductor nanocrystal of a particular semiconductor material varies with the diameter of the crystal. Generally, a semiconductor nanocrystal is a member of a population of nanocrystals having a distribution of sizes. When the distribution is centered about a single value and narrow, the population can be described as monodisperse. Monodisperse particles can, for example, have at least 60% of the particles fall within a specified particle size range.

Semiconductor nanocrystals can be a sphere, rod, disk, or other shape.

Semiconductor nanocrystals demonstrate quantum confinement effects in their luminescent properties. A semiconductor nanocrystal is capable of emitting light upon excitation. A semiconductor nanocrystal can be excited by irradiation with an excitation wavelength of light, by electrical excitation, or by other energy transfer.

The emission from a semiconductor nanocrystal can be a narrow Gaussian emission band that can be tuned through the complete wavelength range of the ultraviolet, visible, or infra-red regions of the spectrum by varying the size of the semiconductor nanocrystal, the composition of the semiconductor nanocrystal, or both.

In certain embodiments, the semiconductor nanocrystals of the invention comprise semiconductor nanocrystals that are capable of emitting light with a peak emission wavelength in a range from about 800 nm to about 2 microns upon excitation.

Photoluminescence quantum efficiency (also referred to as quantum efficiency, quantum yield or solution quantum yield) represents the percent of absorbed photons that are reemitted as photons upon excitation by irradiation with an excitation wavelength of light.

A nanocrystal is a nanometer sized particle, e.g., in the size range of up to about 1000 nm. In certain embodiments, a nanocrystal can have a size in the range of up to about 100 nm. In certain embodiments, a nanocrystal can have a size in the range up to about 20 nm (such as about 1, 2, 3, 4, 5, 6, 7, 8, 9, 10, 11, 12, 13, 14, 15, 16, 17, 18, 19, or 20 nm). In certain embodiments, a nanocrystal can have a size less than 100 Å.

In accordance with one aspect of the present invention, there is provided there is provided a method for preparing semiconductor nanocrystals comprising indium arsenide, the method comprising:

heating a first mixture including nanocrystal seeds comprising indium arsenide with an absorbance in a range from about 700 to 800 nm and a liquid medium in a reaction vessel to a first temperature; and combining the nanocrystals seeds comprising indium arsenide with an indium-source mixture and an arsenic-source mixture under conditions suitable to increase the size of the seeds to form the semiconductor nanocrystals comprising indium arsenide, wherein the indium-source mixture includes an indium precursor, trialkylphosphine, and a carboxylic acid; and the arsenic-source mixture includes a liquid medium and an arsenic precursor represented by the formula (I):

$$As(Y(R)_3)_3 \quad\quad (I)$$

where Y is Ge, Sn, or Pb; and each R, independently, is alkyl, alkenyl, alkynyl, cycloalkyl, cycloalkenyl, heterocyclyl, aryl, or heteroaryl, wherein each R, independently, is optionally substituted by 1 to 6 substituents independently selected from hydrogen, halo, hydroxy, nitro, cyano, amino, alkyl, cycloalkyl, cycloalkenyl, alkoxy, acyl, thio, thioalkyl, alkenyl, alkynyl, cycloalkenyl, heterocyclyl, aryl, or heteroaryl.

The compound of formula (I) can be tris(trimethylgermyl) arsine; tris(trimethylstannyl)arsine; or tris(trimethylplumbyl)arsine.

In certain embodiments, Y is preferably Ge. Each R, independently, can be alkyl, cycloalkyl, or aryl. Each R, independently, can be unsubstituted alkyl, unsubstituted cycloalkyl, or unsubstituted aryl.

A liquid medium for use in the present method can comprise a coordinating solvent or a weakly coordinating solvent. A coordinating solvent is a compound having at least one donor site (e.g., a lone electron pair) that, for example, is available to coordinate to a surface of the growing nanocrystal. Solvent coordination can stabilize the growing nanocrystal. Examples of coordinating solvents include alkyl phosphines, alkyl phosphine oxides, alkyl phosphonic acids, or alkyl phosphinic acids, however, other coordinating solvents, such as pyridines, furans, and amines may also be suitable for the nanocrystal production. More specific examples of suitable coordinating solvents include pyridine, tri-n-octyl phosphine (TOP), tri-n-octyl phosphine oxide (TOPO) and trishydroxylpropylphosphine (tHPP). Technical grade TOPO can be used. In certain embodiments, a coordinating solvent or a weakly coordinating solvent is preferred.

A liquid medium can comprise a non-coordinating solvent. Examples of other non-coordinating solvents that may be useful include, but are not limited to, squalane, octadecane, or any other saturated hydrocarbon molecule.

Other examples of liquid media include, but are not limited to, octadecene, squalene, methyl myristate, octyl octanoate, hexyl octanoate, and $CH_3(CH_2)_nC(O)O(CH_2)_m CH_3$ wherein n=4-18 and m=1-8, dioctyl ether, and diphenyl ether, and mixtures of one or more solvents. In certain embodiments, a mixture can comprise a mixture, (including but not limited to a eutectic mixture) of biphenyl and diphenyl oxide, including, e.g., DOWTHERM A, available from the Dow Chemical Company. Other high boiling point ethers (e.g., BP>~200° C.) may also be used. Such ethers (coordinating) can be aromatic ethers, aliphatic ethers or aromatic aliphatic ethers. Examples of additional ethers include, but are not limited to, dihexyl ether, diethyleneglycol dimethyl ether, diethyleneglycol dibutyl ether, triethyleneglycol dimethyl ether, tetraethyleneglycol dimethyl ether, butyl phenyl ether, benzyl phenyl ether, dibenzyl ether, ditolyl ether and isomers thereof. A liquid medium can also comprise a mixture of solvents.

Other liquid media for use in the methods taught herein can be readily ascertained by one of ordinary skill in the art.

An indium-source mixture for use in the present method includes an indium precursor, a coordinating solvent, and a carboxylic acid.

An indium precursor includes indium. Examples of indium precursors include, for example, elemental indium, a covalent compound, an ionic compound, and/or a coordination complex, that can serve as a source for indium in the resulting nanocrystal. For example, an indium metal precursor can constitute a wide range of substances, including, but not limited to, indium oxide, an indium salt (e.g., a indium carbonate, indium bicarbonate, indium sulfate, indium sulfite, indium phosphate, indium phosphite, an indium halide, an indium carboxylate, a an indium alkoxide, an indium thiolate, an indium amide, an indium alkyl, an indium aryl, other organometallics, a metal coordination complex, an indium solvate, and the like. For example, non-limiting examples of indium precursors include In(III) acetate, In(III) trifluoroacetate, trialkyl indium ($InR_3$) (wherein R=methyl, ethyl, propyl, butyl, pentyl, hexyl, isopropyl, isobutyl, tert-butyl, etc.).

An indium-source mixture also includes a carboxylic acid. A carboxylic acid refers to a compound including at least one carboxylic acid group. A carboxylic acid may have one or more alkyl and/or aryl groups, that, in either or both cases, can be independently substituted or unsubstituted. In certain embodiments a carboxylic acid can be a mixture including one or more carboxylic acids. Examples of a carboxylic acid, but are not limited to, $CH_3(CH_2)_nC(O)OH$ wherein n=1-18, e.g, $CH_3(CH_2)_nC(O)OH$ wherein n=6-18, and carboxylate salts thereof. Additional examples of particular carboxylic acid compounds include octanoic [caprylic] acid, nonanoic [pelargonic] acid, decanoic [capric] acid, undecanoic acid, dodecanoic [lauric] acid, tridecanoic acid, tetradecanoic [myristic] acid, pentadecanoic acid, hexadecanoic [palmitic] acid, heptadecanoic [margaric] acid, octadecanoic [stearic] acid, nonadecanoic acid, eicosanoic [arachidic] acid or oleic acid. According to a certain aspect, the carboxylic acid comprises myristic acid or oleic acid. Other carboxylic acids for use in the method can be identified by one of ordinary skill in the art.

Exemplary carboxylic acid compounds include, but are not limited to, myristic acid and stearic acid.

An indium-source mixture also includes a coordinating solvent. A weakly coordinating solvent can also be used. Coordinating solvents and weakly coordinating solvents are discussed above. A preferred coordinating solvent for inclusion in an indium source mixture includes trialkyl phosphine, e.g., trioctylphosphine (TOP).

According to one aspect, the precursors, first mixture, indium-source mixture, arsenic-source mixture, any liquid media, and the reaction mixture are oxygen free.

According to one aspect, each of the precursors, first mixture, indium-source mixture, arsenic-source mixture, any liquid media, and the reaction mixture are degassed.

According to one aspect, the method is carried out under oxygen-free conditions.

The present method includes a step comprising heating a first mixture including nanocrystal seeds comprising indium arsenide with an absorbance in a range from about 700 to 800 nm and a liquid medium in a reaction vessel to a first temperature.

In certain embodiments, the first temperature is less than or equal to 200° C. For example, the first temperature can be in a range from about 80° C. to about 200° C. An exemplary temperature is 190° C. Other temperatures may be determined to be useful or desirable.

Nanocrystal seeds comprising indium arsenide with an absorbance in a range from about 700 to 800 nm can be prepared, for example, by a method comprising contacting an indium-precursor compound with an arsenic-donor, wherein the arsenic donor is represented by the formula (I):

$$As(Y(R)_3)_3 \quad (I)$$

where X is a group V element; Y is Ge, Sn, or Pb; and each R, independently, is alkyl, alkenyl, alkynyl, cycloalkyl, cycloalkenyl, heterocyclyl, aryl, or heteroaryl, wherein each R, independently, is optionally substituted by 1 to 6 substituents independently selected from hydrogen, halo, hydroxy, nitro, cyano, amino, alkyl, cycloalkyl, cycloalkenyl, alkoxy, acyl, thio, thioalkyl, alkenyl, alkynyl, cycloalkenyl, heterocyclyl, aryl, or heteroaryl, under suitable conditions to form nanocrystal seeds comprising indium arsenide with an absorbance in a range from about 700 to 800 nm, and isolating the seeds from the growth medium. The compound of formula (I) can be tris(trimethylgermyl)arsine; tris(trimethylstannyl)arsine; or tris(trimethylplumbyl)arsine. Additional information useful for preparing relating to preparing nanocrystal seeds comprising indium arsenide includes U.S. Provision Application No. 62/202,784, of Kamplain, et al., filed 7 Aug. 2015, entitled "Semiconductor Nanocrystals And Methods Of Preparation", International Publication No. WO/2013/040365 of MIT, for "Highly Luminescent Semiconductor Nanocrystals", published 21 Mar. 2013; International Application No. PCT/US2007/024320, of Clough, et al., for "Nanocrystals Including A Group III A Element And A Group V A Element, Method, Composition, Device And Other Products", filed 21 Nov. 2007, International Publication No. WO 2012/099653 of QD Vision, Inc., for "Semiconductor Nanocrystals And Methods Of Preparation" published 26 Jul. 2012; International Publication No. WO 2013/173409 A1 of QD Vision, Inc. for "Semiconductor Nanocrystals And Methods Of Preparation", published 21 Nov. 2013, each of which is hereby incorporated herein by reference in its entirety.

The method of the present invention also includes combining the nanocrystals seeds comprising indium arsenide with an indium-source mixture and an arsenic-source mixture under conditions suitable to increase the size of the seeds to form the semiconductor nanocrystals comprising indium arsenide.

In certain embodiments, either or both of the indium-source mixture and the arsenic-source mixture can be added to the reaction vessel in a controlled manner The manner of addition for each can be the same as, or different from, that used for the other. Aspects of addition that can be controlled include, but are not limited to, rate of addition, size or amount of each addition, order of addition (e.g., sequential, alternating, etc.).

The amounts of indium-precursors and arsenic precursors added to the nanocrystal seeds vessel to increase the size thereof is selected to achieve a semiconductor nanocrystal that can emit light at the desired wavelength.

In certain embodiments, the arsenic-source mixture is provided to the reaction vessel including the seeds as a substantially steady or substantially constant infusion or feed or source and the indium-source mixture is added as one or more discrete additions, one being added before the addition of the arsenic-source mixture is initiated.

In certain embodiments, heating of the reaction vessel is continued during the addition of the arsenic-source mixture and indium-source mixture to the reaction vessel.

In certain embodiments, the method further comprises continuing to heat the reaction vessel after the addition of the arsenic-source mixture and indium-source mixture to the reaction vessel is completed.

In certain embodiments, an amount of an indium-source mixture can be added to the reaction vessel including the first mixture at the first temperature, the first temperature can be increased to a second temperature and a periodic addition of predetermined amounts of an arsenic-source mixture to the reaction vessel is initiated, the temperature of the reaction vessel is increased during the addition of the arsenic-source mixture to a third temperature, and additional amount of the indium-source mixture is added to the reaction vessel, and the reaction vessel is heated or maintained at the third temperature to form semiconductor nanocrystals comprising indium arsenide. Heating at the third temperature can be carried out, for example, for up to an hour, up to two hours, up to three hours, or any period in between. Heating for a period longer than three hours may be determined to be useful or desirable. The second temperature can be, for example, in a range from about 180° C. to about 220° C. The second temperature is typically higher than the first temperature. For example, if the first temperature is 190° C., a second temperature can be 200° C. Other differences between the first temperature and the second temperature may also be determined to be useful or desirable. The third temperature is typically higher than the second temperature. In certain embodiments, for example, the third temperature can be in a range from about 260° C. to about 285° C. Other temperatures may be determined to be useful or desirable.

Heating of the reaction vessel during the method can be controlled by a thermo-controller, with the temperature increasing at a steady rate until the third temperature is reached, with additions or initiation of additions of precursors occurring at a first temperature and second temperature, examples of which are provided.

The present invention will be further clarified by the following non-limiting examples, which are intended to be exemplary of the present invention.

EXAMPLES

Example 1

A 1.2 mL quantity of isolated InAs nanocrystal seeds, absorbing at 753 nm stored in hexane is added to a 100 mL four neck round bottom flask with 10 mL of ODE. This mixture is degassed at 80° C. until all hexane come off. The reaction vessel is then put under nitrogen flow. Syringes of precursors are prepared as follows: two syringes of 1.1 mL of 0.3M Indium Myristate in trioctylphosphine (TOP) with 15.6 mgs of acetic acid are prepared; and one syringe of 333.66 mgs of tris(trimethylgermyl)arsine (As(GeMe$_3$)$_3$) in 8.4 mL of 1-octadecene (ODE). The syringe containing the As(GeMe$_3$)$_3$ in ODE is fitted into a syringe pump, with the infusion rate set to 2.8 ml/hour. The thermo controller is then set to 275° C. When the reaction reaches 190° C., one syringe containing indium myristate in TOP and acetic acid is injected into the reaction mixture. When the reaction mixture reaches 200° C., the infusion of the As(GeMe$_3$)$_3$ in ODE is started. After one hour, the second and final syringe of indium myristate in TOP and oleic acid is injected into the reaction mixture. After two hours, the heating mantel is removed and the reaction vessel permitted to cool.

Figure 1B:
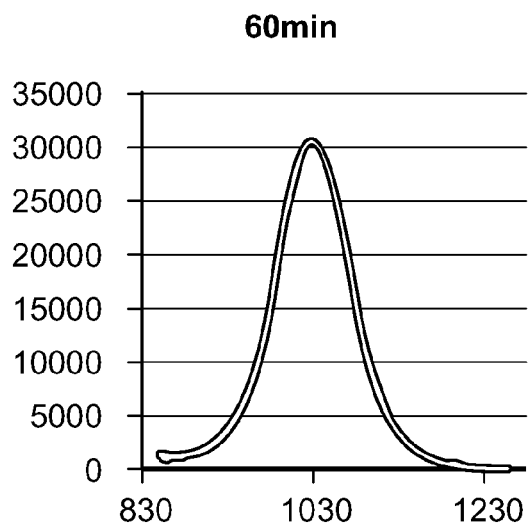
Figure 1C:
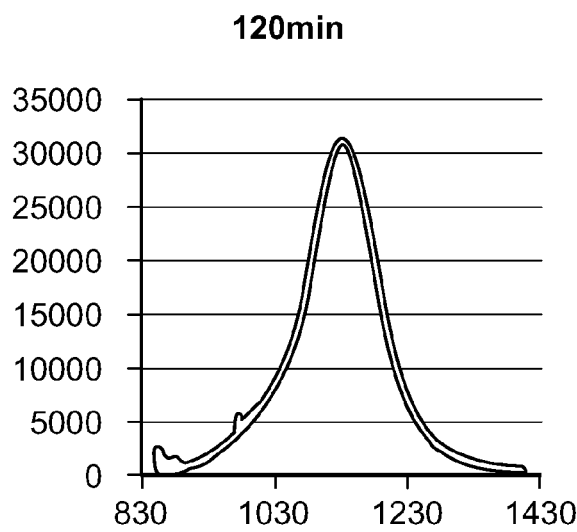
Figure 1D:
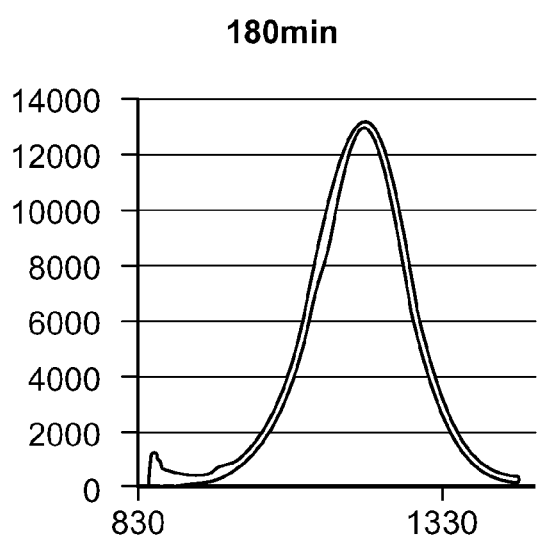

FIG. 1A graphically depicts absorbance measured at T=60 minutes, at T=120 minutes, and at T=360 minutes. FIGS. 1B-1D graphically depicts emission peaks for samples of nanocrystals taken from the reaction vessel at various times (at 60 minutes (1B), at 120 minutes (1C), and at 180 minutes (1D)) after infusion of the arsenic-source mixture is started. At T=180, the sample has a HWHM of 96 (0.77 eV).

Example 2

A 2.5 mL quantity of isolated InAs seed, absorbing at 752 nm stored in hexane is added to a 100 mL four neck round bottom flask with 10 mL of 1-octadecene (ODE). This mixture is degassed at 80° C. until all hexane come off. The reaction vessel is then put under nitrogen flow. Syringes of precursors are prepared as follows: two syringes of 1.1 mL of 0.3M Indium Myristate in trioctylphosphine (TOP) with 150 mgs of oleic acid are prepared; and one syringe of 320 mgs of tris(trimethylgermyl)arsine (As(GeMe$_3$)$_3$) in 8 mL of ODE. The syringe containing the As(GeMe$_3$)$_3$ in ODE is fitted into a syringe pump, with the infusion rate set to 4 ml/hour. The thermo controller is then set to 275° C. When the reaction reaches 190° C., one syringe containing indium myristate in TOP and oleic acid is injected into the reaction mixture. When the reaction mixture reaches 200° C., the infusion of the As(GeMe$_3$)$_3$ in ODE is started. After one hour, the second and final syringe of indium myristate in TOP and oleic acid is injected into the reaction mixture. After two hours, the heating mantel is removed and the reaction vessel permitted to cool.

Figure 2:
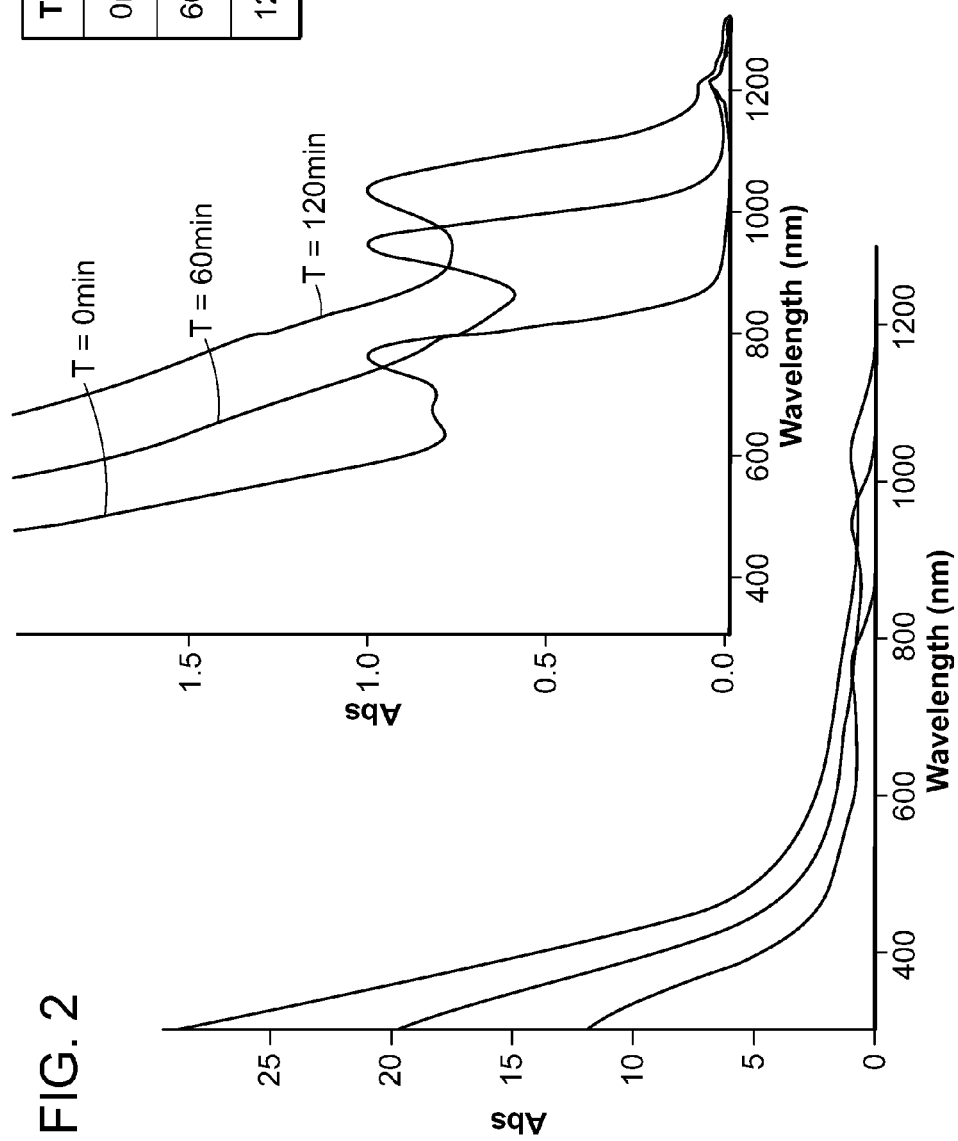
FIG. 2 graphically depicts data relating to various examples described in the specification For a better understanding of the present invention, together with other advantages and capabilities thereof, reference is made to the following disclosure and appended claims in connection with the above-described drawings.

FIG. 2 graphically depicts absorbance and emission peaks for samples of nanocrystals taken from the reaction vessel when the infusion of the arsenic-source mixture is started, and at 60 and 120 minutes thereafter. At T=120, the sample has a HWHM of 66 (0.71 eV).

The control of the size distribution is improved using the method of the present invention.

In various aspects, semiconductor nanocrystals can include one or more ligands.

Ligands can be derived from a coordinating solvent that may be included in the reaction mixture during the growth process. Alternatively, ligands can be added to the reaction mixture or ligands can be derived from a reagent or precursor included in the reaction mixture for synthesizing the semiconductor nanocrystals. In certain embodiments, semiconductor nanocrystals can include more than one type of ligand attached to an outer surface.

Examples of ligands include, but are not limited to, fatty acids and other carboxylic acid compounds, phosphonic acid compounds, amine compounds, phosphines, phosphine oxides, etc. Examples of additional ligands include fatty acids, long chain fatty acids such as oleic acid, alkyl phosphines, alkyl phosphine oxides, alkyl phosphonic acids, or alkyl phosphinic acids, pyridines, furans, and amines More specific examples include, but are not limited to, pyridine, tri-n-octyl phosphine (TOP), tri-n-octyl phosphine oxide (TOPO), tris-hydroxylpropylphosphine (tHPP) and octadecylphosphonic acid ("ODPA"). Technical grade TOPO can be used.

Suitable coordinating ligands can be purchased commercially or prepared by ordinary synthetic organic techniques readily ascertainable by the skilled artisan.

As mentioned above, the method described herein can further include growing an overcoating comprising one or more semiconductor materials over at least a portion of an outer surface of at least a portion of the semiconductor nanocrystal cores. A coating can further comprise one or more layers, each of which can be the same as, or different from, another layer in the coating. Additional information relating to overcoating can be found in various of the patent applications and publications incorporated herein by reference.

In one aspect, overcoating comprises adding one or more overcoating precursors to the semiconductor nanocrystal cores included a liquid medium, and reacting the overcoating precursors to form an overcoating comprising one or more semiconductor materials over at least a portion of an outer surface of at least a portion of the semiconductor nanocrystal cores.

Optionally, the overcoating mixture can further include one or more ligands. Examples of such ligands can include, without limitation, ligands discussed elsewhere herein.

According to one aspect, the overcoating step carried out under oxygen-free conditions.

The overcoating can include one or more semiconductor materials having a composition different from the composition of the core and can have a band gap greater than the band gap of the core. The overcoat of a semiconductor material on a surface of the nanocrystal can include a Group II-VI compounds, Group II-V compounds, Group III-VI compounds, Group III-V compounds, Group IV-VI compounds, Group IV compounds, Group II-IV-VI compounds, and Group II-IV-V compounds, with Group I referring to Group IB (e.g., Cu, Ag, Au) of the Periodic Table, Group II referring to Group IIB (e.g., Zn, Cd, Hg) of the Periodic Table, Group III referring to Group IIIA (e.g., Al, Ga, In, Tl) of the Periodic Table, Group IV (e.g., Si, Ge) of the Periodic Table, Group V referring to Group VA (e.g., N, P, As, Sb) of the Periodic Table (Group V elements also known as pnictogens), and Group VI referring to Group VIA (e.g., O, S, Se, Te) of the Periodic Table (Group VI elements also known as chalcogens).

One or more overcoating precursors are selected to include those elements to be included in the semiconductor material of the desired overcoating. Amounts of the overcoating precursors are selected based on the desired overcoating thickness. Such selections are within the skill of the person of ordinary skill in the relevant art.

An overcoating can have a thickness from about one to about ten monolayers. An overcoating can also have a thickness greater than ten monolayers. In certain embodiments, more than one overcoating can be included on a core.

In certain embodiments, the surrounding overcoating or "shell" material can have a band gap greater than the band gap of the core material. In certain other embodiments, the surrounding shell material can have a band gap less than the band gap of the core material.

In certain embodiments, the shell can be chosen so as to have an atomic spacing close to that of the "core" substrate.

Size distribution during the reaction process can be estimated by monitoring the absorption or emission line widths of the particles. Modification of the reaction temperature in response to changes in the absorption spectrum of the particles allows the maintenance of a sharp particle size distribution during growth.

The particle size distribution of the semiconductor nanocrystals (including, e.g., semiconductor nanocrystals) can be further refined by size selective precipitation with a poor solvent for the semiconductor nanocrystals, such as methanol/butanol. For example, semiconductor nanocrystals can be dispersed in a solution of 10% butanol in hexane. Methanol can be added dropwise to this stirring solution until opalescence persists. Separation of supernatant and flocculate by centrifugation produces a precipitate enriched with the largest crystallites in the sample. This procedure can be repeated until no further sharpening of the optical absorption spectrum is noted. Size-selective precipitation can be carried out in a variety of solvent/nonsolvent pairs, including pyridine/hexane and chloroform/methanol. The size-selected semiconductor nanocrystal (e.g., semiconductor nanocrystal) population preferably has no more than a 15% rms deviation from mean diameter, more preferably 10% rms deviation or less, and most preferably 5% rms deviation or less.

A semiconductor nanocrystal is capable of emitting light upon excitation. A semiconductor nanocrystal can be excited by irradiation with an excitation wavelength of light, by electrical excitation, or by other energy transfer.

In general, semiconductor nanocrystals, including those prepared by the present method, can have an average particle size in a range from about 1 to about 1000 nanometers (nm), and preferably in a range from about 1 to about 100 nm. In certain embodiments, semiconductor nanocrystals have an average particle size in a range from about 1 to about 20 nm (e.g., such as about 2, 3, 4, 5, 6, 7, 8, 9, 10, 11, 12, 13, 14, 15, 16, 17, 18, 19, or 20 nm). In certain embodiments, semiconductor nanocrystals have an average particle size in a range from about 1 nm to about 20 nm or about 1 nm to about 10 nm Semiconductor nanocrystals can have an average diameter less than about 150 Angstroms (Å). In certain embodiments, semiconductor nanocrystals having an average diameter in a range from about 12 to about 150 Å can be particularly desirable. However, depending upon the composition, structure, and desired emission wavelength of the semiconductor nanocrystal, the average diameter may be outside of these ranges. The size of a nanocrystal can be determined, for example, by direct transmission electron microscope measurement. Other known techniques can also be used to determine nanocrystal size.

Nanocrystals can have various shapes. Examples of the shape of a nanocrystal include, but are not limited to, sphere, rod, disk, tetrapod, other shapes, and/or mixtures thereof.

A semiconductor material may comprise a compound, a doped compound, an undoped compound, and/or an alloy. A nanocrystal core surrounded by a shell is also referred to as having a "core/shell" structure.

Semiconductor nanocrystals can have optical properties arising from quantum confinement. The particular composition(s), structure, and/or size of a semiconductor nanocrystal can be selected to achieve the desired wavelength of light to be emitted from the semiconductor nanocrystal upon stimulation with a particular excitation source. Semiconductor nanocrystals may be tuned to emit light across the spectrum, e.g., ultraviolet, visible, or infra-red regions, by changing their size. A monodisperse population of semiconductor nanocrystals can emit light spanning a narrow range of wavelengths.

In certain embodiments, emission from a semiconductor nanocrystal described herein can be a Gaussian emission band, in visible, near-infrared, or infra-red regions of the spectrum by varying the size of the semiconductor nanocrystal, the composition of the semiconductor nanocrystal, or both. Spectral emissions having a full width at half max (FWHM) no greater than 100 nm can be desirable.

Semiconductor nanocrystals prepared by a method in accordance with the present invention can be included in a taggant material. A taggant material can include semiconductor nanocrystals having a predetermined emission wavelength. In certain embodiments, multiple types of semiconductor nanocrystals with differing emission wavelengths can be included in a taggant to provide coding capability for generating a predetermined code. The intensity of the semiconductor nanocrystal emission can depend on the number of semiconductor nanocrystals. Examining the spectral intensity and wavelength of the peaks can generate unique codes. Filters (e.g., bandpass filters) can be used in viewing the semiconductor nanocrystals emission to discriminate between different semiconductor nanocrystals emission wavelengths. By varying the types of semiconductor nanocrystals constituents and varying the concentration thereof in the taggant material, different codes can be generated.

Additional information that may be useful with the present invention is included in International Publication No. WO/2013/040365 of MIT, for "Highly Luminescent Semiconductor Nanocrystals", published 21 Mar. 2013; International Application No. PCT/US2009/004345, of Breen, et al for "Nanoparticle Including Multi-Functional Ligand And Method", filed 28 Jul. 2009, International Application No. PCT/US2007/024320, of Clough, et al., for "Nanocrystals Including A Group III A Element And A Group V A Element, Method, Composition, Device And Other Products", filed 21 Nov. 2007, International Publication No. WO 2012/099653 of QD vision, Inc., for "Semiconductor Nanocrystals And Methods Of Preparation" published 26 Jul. 2012; International Publication No. WO 2013/173409 A1 of QD Vision, Inc. for "Semiconductor Nanocrystals And Methods Of Preparation", published 21 Nov. 2013; International Application No. PCT/US2007/13152 of Coe-Sullivan, et al., for "Light-Emitting Devices and Displays With Improved Performance", filed 4 Jun. 2007; and U.S. Ser. No. 12/283,609 of Coe-Sullivan, et al. for "Compositions, Optical Component, System Including An Optical Component, Devices, And Other Products", filed 12 Sep. 2008. The disclosures of each of the foregoing applications are hereby incorporated herein by reference in their entireties.

As used herein, the singular forms "a", "an" and "the" include plural unless the context clearly dictates otherwise. Thus, for example, reference to an emissive material includes reference to one or more of such materials.

The entire contents of all patent publications and other publications cited in this disclosure are hereby incorporated herein by reference in their entirety. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method for preparing semiconductor nanocrystals comprising indium arsenide, the method comprising:
   heating a first mixture including nanocrystal seeds comprising indium arsenide with an absorbance in a range from about 700 to 800 nm and a liquid medium in a reaction vessel to a first temperature; and
   combining the nanocrystals seeds comprising indium arsenide with an indium-source mixture and an arsenic-source mixture under conditions suitable to increase the size of the seeds to form the semiconductor nanocrystals comprising indium arsenide,
   wherein the indium-source mixture includes an indium precursor, a coordinating solvent, and a carboxylic acid; and the arsenic-source mixture includes a liquid medium and an arsenic precursor represented by the formula (I):

$$As(Y(R)_3)_3 \quad (I)$$

where Y is Ge, Sn, or Pb; and each R, independently, is alkyl, alkenyl, alkynyl, cycloalkyl, cycloalkenyl, heterocyclyl, aryl, or heteroaryl, wherein each R, independently, is optionally substituted by 1 to 6 substituents independently selected from hydrogen, halo, hydroxy, nitro, cyano, amino, alkoxy, acyl, thio, and thioalkyl.

2. A method in accordance with claim 1 wherein the compound of formula (I) comprises tris(trimethylgermyl)arsine.

3. A method in accordance with claim 1 wherein the carboxylic acid comprises acetic acid.

4. A method in accordance with claim 1 wherein the carboxylic acid comprises oleic acid.

5. A method in accordance with claim 1 wherein the coordinating solvent comprises trioctylphosphine.

6. A method in accordance with claim 1 wherein the first temperature is in a range from about 160° C. to about 200° C.

7. A method in accordance with claim 1 wherein the mixture is heated to a second temperature is in a range from about 180° C. to about 220° C.

8. A method in accordance with claim 1 wherein the mixture is heated to a third temperature is in a range from about 260° C. to about 285° C.

9. A method in accordance with claim 1 wherein the arsenic-source mixture is added to the reaction vessel including the nanocrystal seeds at a controlled rate of addition and the indium-source mixture is added as one or more discrete additions, one being added before the addition of the arsenic-source mixture is initiated.

10. A method in accordance with claim 1 wherein the semiconductor nanocrystals comprising indium arsenide emit light at a wavelength in a range of 800 to 1200 nm.

11. A method in accordance with claim 1 wherein the indium precursor comprises an indium carboxylate.

12. A method in accordance with claim 1 wherein the indium precursor comprises indium myristate.

13. A method in accordance with claim 1 wherein the semiconductor nanocrystals comprising indium arsenide emit light with a half width at half maximum of less than 0.100 eV.

14. A method in accordance with claim 1 wherein a growth of the nanocrystal seeds is carried out in the absence of an amine.

* * * * *